(12) United States Patent
Katahira

(10) Patent No.: US 6,480,696 B1
(45) Date of Patent: Nov. 12, 2002

(54) IMAGE FORMING APPARATUS AND IMAGE FORMING METHOD

(75) Inventor: Shunsuke Katahira, Hachioji (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/843,843

(22) Filed: Apr. 30, 2001

(51) Int. Cl.$^7$ ................................ G03G 15/00
(52) U.S. Cl. ................ 399/401; 399/16; 399/43
(58) Field of Search ........................ 399/401, 394, 399/396, 364, 16, 43

(56) References Cited

U.S. PATENT DOCUMENTS

| | | | |
|---|---|---|---|
| 5,708,935 A | * | 1/1998 | Rabjohns ............... 399/401 X |
| 5,930,577 A | * | 7/1999 | Forsthoefel et al. ........ 399/401 |

FOREIGN PATENT DOCUMENTS

| | | | |
|---|---|---|---|
| JP | 4-045071 | | 2/1992 |
| JP | 5-006049 | | 1/1993 |
| JP | 9-120243 | * | 5/1997 |
| JP | 2000-127549 | | 5/2000 |
| JP | 2000-147842 | | 5/2000 |

* cited by examiner

Primary Examiner—Sophia S. Chen
(74) Attorney, Agent, or Firm—Foley & Lardner

(57) ABSTRACT

The invention provides and image forming apparatus adapted to form images on the opposite surfaces of a sheet of copying paper. More specifically, an image forming apparatus according to the invention is adapted for forming images on the opposite surfaces of a sheet of copying paper and includes a control device for controlling the location of the image formed on one of the opposite surfaces of the sheet of copying paper in correspondence to the location of the image formed on the other surface of the sheet of copying paper in order to minimize the mis-registration of the images formed on the opposite surfaces of the sheet of copying paper.

12 Claims, 5 Drawing Sheets

IMAGE FORMING APPARATUS AND IMAGE FORMING METHOD

BACKGROUND OF THE INVENTION

This invention relates to an improvement to an image forming apparatus and also to an image forming method adapted to forming an image on both sides of a sheet of copying paper.

As is well known, it is highly important for an image forming apparatus of the above identified type that it can effectively eliminate any mis-registration between the image formed on the front surface of a sheet of copying paper and the image formed on the rear surface of the sheet.

Japanese Patent Application Laid-Open No. 2000-147842 describes a method of synchronizing the printing operation of the front surface printing mechanism adapted to continuously printing an image on the front surfaces of a number of sheets of copying paper and that of the rear surface printing mechanism adapted to continuously printing another image on the rear surfaces of the sheets of copying paper in a controlled way.

However, the technology of eliminating any mis-registration between the images formed on the opposite surfaces of a sheet of copying paper, including the above described known method, is still on the way toward perfection. In other words, any known techniques in the technological field under consideration are accompanied by the problem of a large and complex apparatus that operates in a complex way and does not provide a level of reliability required for practical applications.

BRIEF SUMMARY OF THE INVENTION

In view of the above identified circumstances, it is therefore the object of the present invention to provide an image forming apparatus and an image forming method that can highly reliably eliminate any mis-registration of the images formed on the opposite surfaces of a sheet of copying paper and hence are adapted to practical applications.

In an aspect of the present invention, the above object is achieved by providing an image forming apparatus adapted to forming images on the opposite surfaces of a sheet of recording paper, the apparatus comprising a control means for controlling the location of the image formed on one of the opposite surfaces of the sheet of recording paper in correspondence to the location of the image formed on the other surface of the sheet of recording paper.

In another aspect of the invention, there is also provided an image forming apparatus having a first image forming means for feeding a sheet of recording paper and forming an image on one of the opposite surfaces of the sheet and a second image forming means for feeding the sheet of recording paper carrying the image formed by the first image forming means on one of the opposite surfaces of the sheet and forming another image on the other surface of the sheet.

The image forming apparatus comprises a time measuring means for measuring the time period from the time when the operation of forming an image on one of the opposite surfaces of the sheet of recording paper of the first image forming means starts to the time when the tail end of the sheet of recording paper passes a predetermined detecting position and a control means for controlling the time of starting the operation of forming another image on the opposite surface of the sheet of recording paper of the second image forming means on the basis of the time period measured by the measuring means.

In still another aspect of the invention, there is provided an image forming method of forming images on the opposite surfaces of a sheet of recording paper, the method comprising a control step for controlling the location of the image formed on one of the opposite surfaces of the sheet of recording paper in correspondence to the location of the image formed on the other surface of the sheet of recording paper.

In a further aspect of the invention, there is provided an image forming method having a first image forming step of feeding a sheet of recording paper and forming an image on one of the opposite surfaces of the sheet and a second image forming step of feeding the sheet of recording paper carrying the image formed by the first image forming means on one of the opposite surfaces of the sheet and forming another image on the other surface of the sheet.

The image forming method comprises a time measuring step for measuring the time period from the time when the operation of forming an image on one of the opposite surfaces of the sheet of recording paper of the first image forming step starts to the time when the tail end of the sheet of recording paper passes a predetermined detecting position and a control step of controlling the time of starting the operation of forming another image on the opposite surface of the sheet of recording paper of the second image forming step on the basis of the time period measured by the measuring means.

Since the above described arrangements and methods are adapted to control the location of the image formed on one of the opposite surfaces of the sheet of recording paper in correspondence to the location of the image formed on the other surface of the sheet of recording paper, they can highly reliably eliminate any mis-registration of the images formed on the opposite surfaces of a sheet of copying paper so that the images formed on the opposite surfaces of a sheet of recording paper can be accurately registered relative to each other.

DETAILED DESCRIPTION OF THE INVENTION

Figure 1:
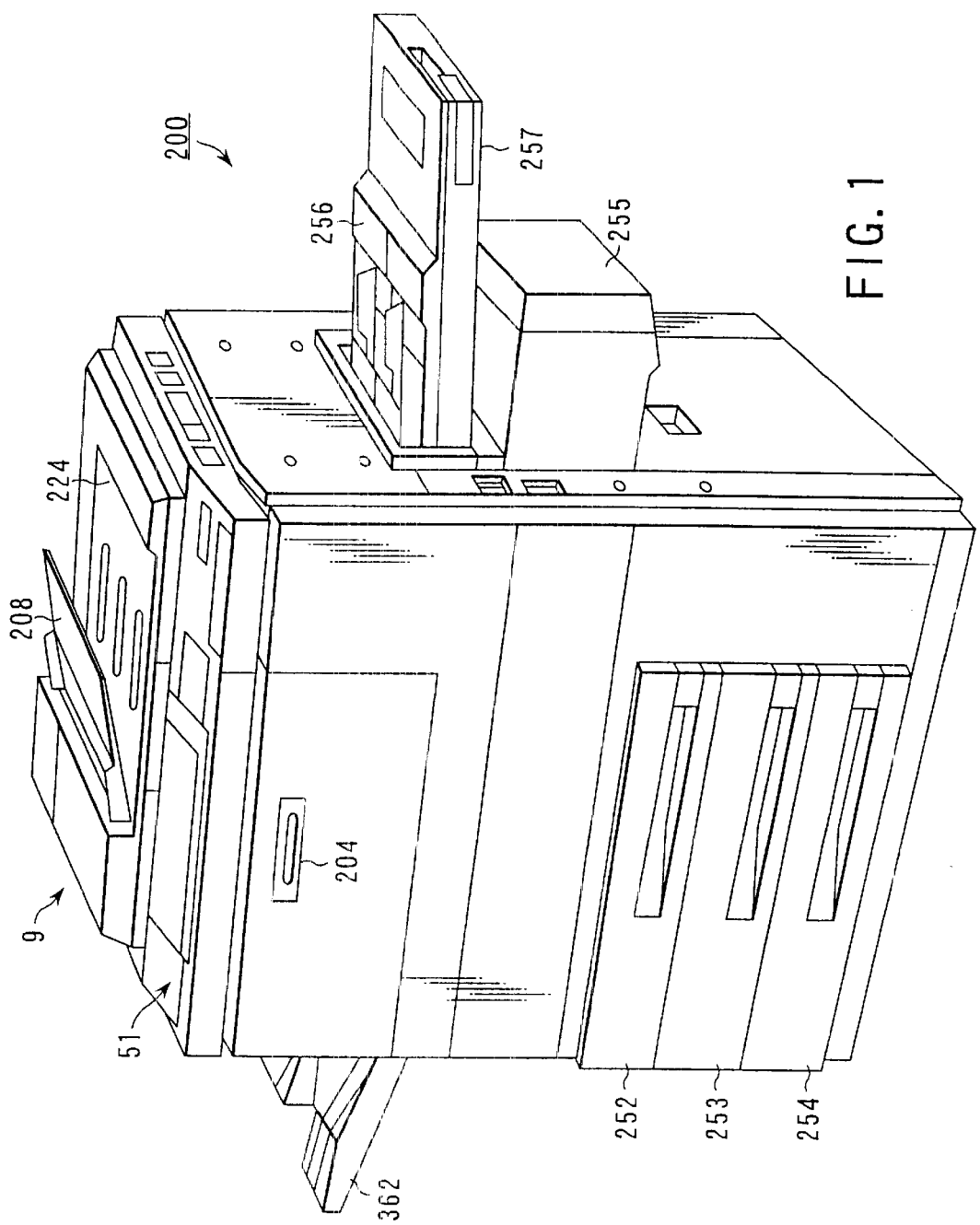
FIG. 1 is a schematic perspective view of a composite type image forming apparatus embodying the present invention in terms of both image forming apparatus and image forming method.

Now, the present invention will be described by referring to the accompanying drawing that illustrates a preferred embodiment of the invention. FIG. 1 is a schematic perspective view of a composite type image forming apparatus (multi-function type copying apparatus) embodying the present invention in terms of both image forming apparatus and image forming method.

The composite type image forming apparatus comprises as main components thereof an apparatus main body 200, an operation panel 51, an automatic original feeder (to be referred to as ADF hereinafter) 9, sheet feeding cassettes 252 through 254 and 257 and a large capacity sheet feeding cassette 255.

The ADF 9 is arranged on top of the apparatus main body 200 to automatically transfer a plurality of sheets of the original on a one by one basis and also operate as original cover so that it can be used to open and close the top of the apparatus.

The operation panel 51 is arranged along the front end of the top of the apparatus main body 200 and provided with various operation keys and display devices to be used for specifying the copying conditions and giving instructions for starting a copying operation.

The sheet feeding cassettes 252 through 254 are removably arranged at a lower part of the apparatus main body 200. The sheet feeding cassettes 252 through 254 contains sheets of copying paper of respective sizes that are arranged either transversally or longitudinally relative to the apparatus main body so that sheets of copying paper of a particular size may be selected for a copying operation.

The sheet of copying paper that has just been used for a copying operation is discharged into a sheet delivery tray 362 arranged at the left side of the apparatus main body 200 in FIG. 1.

The sheet feeding cassette 257 and the large capacity sheet feeding cassette 255 are removably arranged at the right side of the apparatus main body 200 and adapted to contain respectively a small number of sheets of copying paper and a large number of sheets of copying paper. The sheet feeding cassette 257 is provided on the upper surface thereof with a hand feeding tray 256 through which the user can feed sheets of copying paper by hand on a one by one basis.

The apparatus main body 200 contains in the inside a magneto-optic disk device (not shown) for receiving a magneto-optic disk as recording medium and storing video data there. The apparatus main body 200 is additionally provided at an upper front part thereof corresponding to the position of the magneto-optic disk device with an insertion port 204 through which a magneto-optic disk is inserted into the apparatus.

The composite type image forming apparatus is further provided at the back side of the apparatus main body 200 with an external interface that includes a parallel port, a serial port and an SCSI (small computer system interface).

Of these, the parallel port is used to connect an external device such as a PC (personal computer) to the composite type image forming apparatus to make the composite type image forming apparatus operate as printer.

The serial port is used to connect an external device such as a PC to the composite type image forming apparatus in order to read the internal control information of the apparatus and/or select certain functions of the apparatus when servicing the composite type image forming apparatus.

Furthermore, the external interface is used to exchange commands and/or data with an external controller that operates as master.

Figure 2:
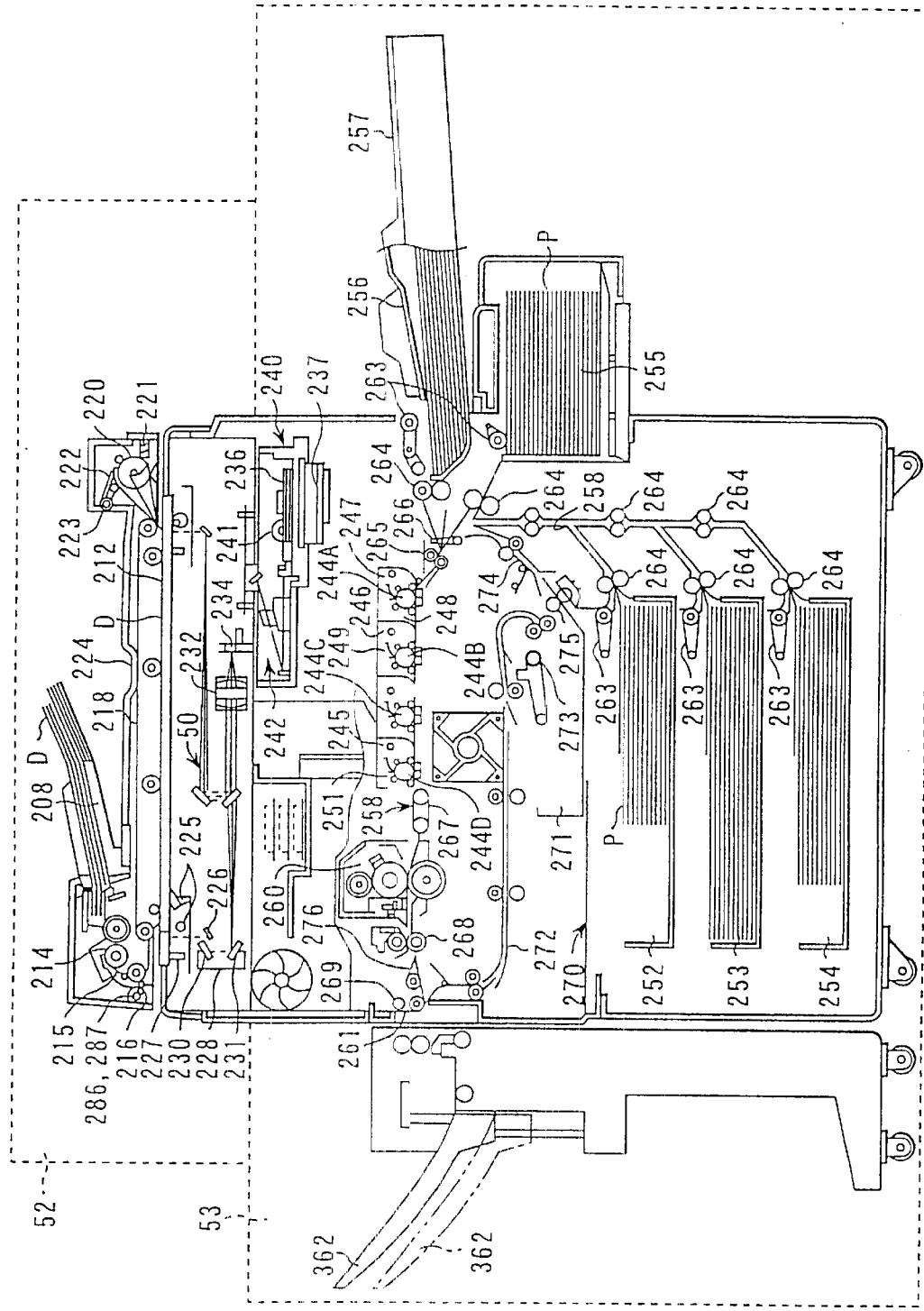
FIG. 2 is a schematic lateral view of the composite type image forming apparatus of FIG. 1, showing the internal structure thereof.

FIG. 2 schematically illustrates the internal structure of the above described composite type image forming apparatus. The apparatus main body 200 contains therein a scanner section 52 for obtaining image data when operating as a copying machine or a facsimile device and a printer section 53 for forming one or more than one images on a sheet of copying paper.

An original stage 212 that is a transparent glass plate is arranged on top of the apparatus main body 200 and adapted to receive and hold an object to be scanned, or original D, thereon. The original D is automatically transferred onto the original stage 212 by means of the ADF 9.

The ADF 9 can be opened and closed relative to the original stage 212 and operates as original keeper that holds the original D placed on the original stage 212 tightly in contact with the latter.

The ADF 9 comprises an original tray 208 for receiving a plurality of sheets of the original D, an empty sensor 209 for detecting the presence or absence of an original D on the original tray 208, a pickup roller 214 for taking out the original D from the original tray 208 on a sheet by sheet basis, a sheet feeding roller 215 for transferring the original taken out from the original tray 208, a pair of aligning rollers 216 for aligning the front end of each sheet of the original D, an aligning sensor 286 arranged upstream relative to the paired aligning rollers 216 for the purpose of detecting the arrival of the original, a size sensor 287 for detecting the size of the original D and a transfer belt 218 arranged so as to substantially cover the entire surface of the original stage 212.

The plurality of sheets of the original D are arranged on the original tray 208 in such a way that the images to be read are facing upward and sequentially taken out by the pickup roller 214 on a one by one basis from the lowermost sheet to that they are transferred by the sheet feeding roller 215. Then, the leading one of the sheets of the original D is aligned in position by the aligning roller 216 and moved to the predetermined right position on the original stage 212 by the transfer belt 218.

The ADF 9 additionally comprises an inverter roller 220, a non-inversion sensor 221, a flapper 222 and a sheet delivery roller 223 that are arranged at the end thereof opposite to the paired aligning rollers 216 with the transfer belt 218 located therebetween.

Thus, the sheet of original D whose image is read by the scanner section 52 is sent out from the original stage 212 by the transfer belt 218 and discharged to original discharge section 224 arranged on top of the ADF 9 by way of the inverter roller 220, the flapper 222 and the sheet delivery roller 223.

When reading the image on the rear surface of the sheet of original D, the operation of the flapper 222 is switched in such a way that the original D transferred by the transfer belt 218 is inverted by the inverter roller 220 and fed back to the predetermined right position on the original stage 212 by the transfer belt 218.

Although not shown, the ADF 9 further comprises a sheet feeding motor for driving the pickup roller 214, the sheet feeding roller 215 and the paired aligning rollers 216 and a transfer motor for driving the transfer belt 218, the inverter roller 220 and the sheet delivery roller 223.

The scanner section 52 arranged in the apparatus main body 200 comprises a light source 225 that may typically be a fluorescent lamp for illuminating the original D placed on the original stage 212 and a first mirror 226 for deflecting the rays of light reflected by the original D to a predetermined direction.

The light source 225 and the first mirror 226 are fitted to a first carriage 227 arranged below the original stage 212. The first carriage 227 additionally carries a size sensor (not shown) for detecting the size of the original D placed on the original stage 212.

The first carriage 227 is movable in parallel with the original stage 212 and adapted to be driven to move back and forth below the original stage 212 by means of a drive motor and a toothed belt (not shown).

A second carriage 228 is also arranged below the original stage 212 so as to be movable in parallel with the latter. A second mirror 230 and a third mirror 231 are fitted to the second carriage 228 and arranged orthogonally relative to each other so that the rays of light reflected by the original D and deflected by the first mirror 226 are subsequently and sequentially deflected by them.

The second carriage 228 is driven to move and follow the first carriage 227 by means of the toothed belt for driving the first carriage 227. More specifically, the second carriage is driven to move in parallel with the original stage 212 at a rate equal to a half of the rate of movement of the first carriage.

An imaging lens 232 adapted to focussing the light reflected from the third mirror 231 on the second carriage 228 and a CCD (charge coupled device) sensor 234 for receiving and photoelectrically converting the light focussed by the imaging lens 232 are arranged downstream relative to the original stage 212.

The imaging leans 232 is adapted to be driven to move by a drive mechanism in such a way that it is movable in a plane containing the optical axis of the light deflected by the third mirror 231. Thus, the optical image produced by the reflected light may be enlarged or reduced to realize a desired magnification as the imaging lens 232 is driven to move.

The CCD sensor 234 converts the reflected light coming from the imaging lens 232, to an electric signal representing the image information read from the original D.

Meanwhile, the printer section 53 arranged in the apparatus main body 200 has a laser exposure unit 240. The laser exposure unit 240 comprises a semiconductor laser 241 operating as light source, a polygon mirror 236 for continuously deflecting the laser beam emitted from semiconductor laser 241, a polygon motor 237 for driving the polygon mirror 236 at a predetermined number of revolutions per unit time and an optical system 242 for deflecting the laser beam from the polygon mirror 236 and leading it to photosensitive drums 244A through 244D.

The semiconductor laser 241 is controlled for its on/off operation according to the image information read out from the original D by the scanner section 52. The laser beam emitted from the semiconductor laser 241 is directed to the photosensitive drums 244 by way of the polygon mirror 236 and the optical system 242 so that an electrostatic latent image is formed on each of the peripheral surfaces of the photosensitive drums 244A through 244D as the it is scanned by the laser beam.

Thus, the four photosensitive drums 244A through 244D rotatably arranged substantially at the center of the apparatus main body 200 constitute an image forming section 50. The peripheral surfaces of the photosensitive drums 244A through 244D are scanned by the laser beam from the laser exposure unit 240 to form a desired electrostatic latent image is formed on each of them.

The photosensitive drums 244A through 244D are provided around them with an electric charger 245 for charging the peripheral surfaces of the photosensitive drums 244A through 244D with electricity, a developing units 246 for developing the electrostatic latent images formed on the peripheral surfaces to a desired image density by supplying toner to the peripheral surfaces, a separation charger 247 for separating the sheet of copying paper P fed from one of the sheet feeding cassettes 252 through 255, 257 from the photosensitive drums 244A through 244D, a transfer charger 248 for transferring the toner images formed on the photosensitive drums 244A through 244D onto the sheet of copying paper P, peeling claws 249 for peeling the sheet of copying paper P from the peripheral surfaces of the photosensitive drums 244A through 244D and a de-electrifier 251 for de-electrifying the peripheral surfaces of the photosensitive drums 244A through 244D.

Sheet feeding cassettes 252, 253, 254 that can be drawn out of the apparatus main body 200 are arranged in a stacked manner at a lower part of the apparatus main body 200. The sheet feeding cassettes 252 through 254 contains sheets of copying paper P of respective sizes that are different from each other.

A large capacity sheet feeding cassette 255 is arranged at a lateral side of the sheet feeding cassettes 252 through 254. The large capacity sheet feeding cassette 255 can typically contain about 3,000 sheets of copying paper P of A4 size that will be popularly used.

Another sheet feeding cassette 257 that can operate as hand feeding tray 256 is arranged above the large capacity sheet feeding cassette 255 in such a way that it is removable from the apparatus main body 200.

In the apparatus main body 200, a transfer route 258 extends from the sheet feeding cassettes 252 through 255, 257 through a transfer section defined between the photosensitive drums 244A through 244D and the transfer charger 248 and a fixing unit 260 is arranged at the downstream end of the transfer route 258.

Then, each of the sheet feeding cassettes 252 through 255, 257 is provided near it with a pickup roller 263 for taking out a sheet of copying paper P from it.

The transfer route 258 is provided with a large number of pairs of sheet feeding rollers 264 for transferring the sheet of copying paper P taken out by the pickup roller 263 to the photosensitive drums 244A through 244D.

A pair of register rollers 265 are arranged along the transfer route 258 at a position upstream relative to the photosensitive drums 244A through 244D. The paired register rollers 265 are adapted to correct any inclination of the taken out sheet of copying paper P and align the toner images on the photosensitive drums 244A through 244D and the image forming operation starting position of the sheet of copying paper P. Then, the register rollers 265 feed the sheet of copying paper P to the transfer section at moving speed exactly same as the moving speed of the peripheral surfaces of the photosensitive drums 244A through 244D.

An aligning sensor 266 is arranged upstream relative to the paired register rollers 265 and closer to the paired sheet feeding rollers 264 for the purpose of detecting the arrival of the original and a transfer belt 218.

With the above described arrangement, firstly sheets of copying paper P are taken out from one of the sheet feeding cassettes 252 through 255, 257 by the corresponding pickup roller 263 on a one by one basis are then fed to the paired register rollers 265 by way of the paired sheet feeding rollers 264.

Then, the leading sheet of copying paper P is aligned at the leading edge thereof by the paired register rollers 265 and then moved to the transfer section. In the transfer section, the images of the developing agent, or the toner images, formed on the photosensitive drums 244A through 244D are transferred onto the sheet of copying paper P by the transfer charger 248.

The sheet of copying paper P now carrying the toner image transferred onto it is separated from the peripheral surfaces of the photosensitive drums 244A through 244D by the separation charger 246 and the separation claws 249 and then moved to the fixing unit 260 by way of the transfer belt 267 that is provided as part of the transfer route 258.

As developing agent forming an image on the sheet of copying paper P is molten and fixed by the fixing unit 260, the sheet of copying paper P is discharged onto the delivery tray 362 through a discharge port 261 by means of a pair of sheet feeding rollers 268 and a pair of sheet discharging rollers 269.

An automatic double siding unit (ADD) 270 is arranged downstream relative to the transfer route 258 in order to turn the sheet of copying paper P coming from the fixing unit 260 upside down and sending it back to the paired register rollers 265.

The automatic double siding unit 270 comprises a temporary collecting section 271 for temporarily collecting sheets of copying paper P, an inverting route 272 branched from the transfer route 258 and adapted to inverting the sheet of copying paper P coming out of the fixing unit 260 and leading it to the temporary collecting section 271, a pickup roller 273 for taking out the sheets of copying paper P collected in the temporary collecting section 271 on a one by one basis and a pair of sheet feeding rollers 275 for feeding the taken out sheet of copying paper P to the paired register rollers 265 by way of transfer route 274.

The bifurcating point producing the transfer route 258 and the inverting route 272 is provided with a sorting gate 276 for sorting each sheet of copying paper P and sending it either through the discharge port 261 or through the inverting route 272.

When images are copied respectively on the opposite sides of a sheet of copying paper, the sheet of copying paper P passing through the fixing unit 260 is sorted by the sorting gate 276 and led to the inverting route 272 before it is temporarily collected in the temporary collecting section 271 in an inverted state and subsequently fed to the paired register rollers 265 by the pickup roller 273 and the paired sheet feeding rollers 275 by way of the transfer route 274.

Thereafter the sheet copying paper P is aligned by the paired register rollers 265 and sent again to the transfer section, where another toner image is formed on the back side of the sheet of copying paper P. Then, the sheet of copying paper P now carrying images on the opposite surfaces thereof is discharged to the delivery tray 362 by way of the transfer route 258, the fixing unit 260 and the paired discharge rollers 269.

Figure 3:
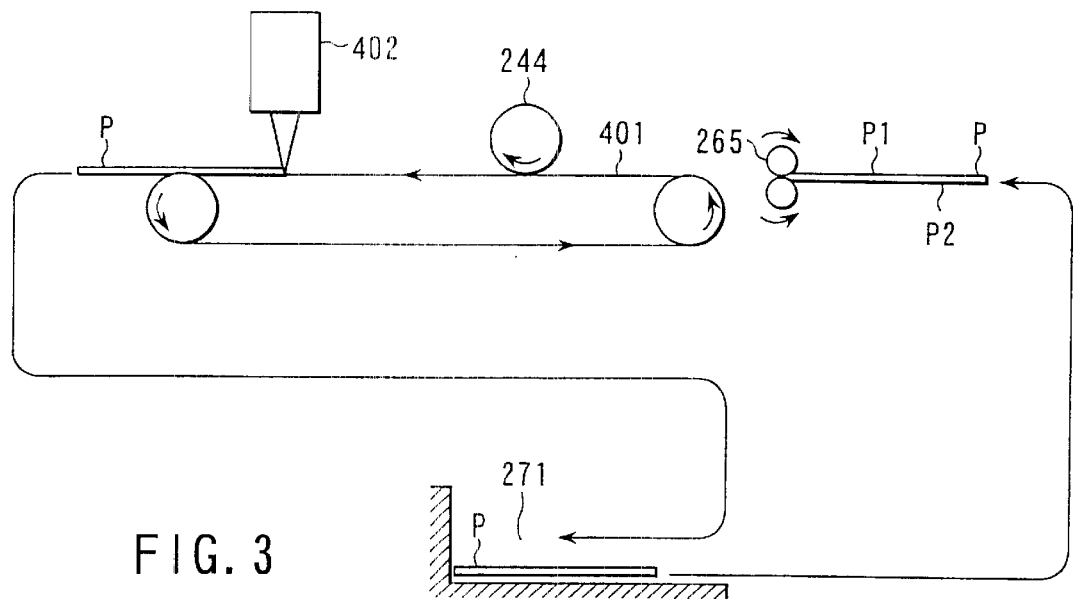
FIG. 3 is a schematic illustration of the mechanism of the embodiment of FIG. 1 for forming images on the opposite surfaces of a sheet of copying paper, showing only a principal part thereof.

Now, the part of the above described composite type image forming apparatus that characterizes the present invention will be discussed below. FIG. 3 is a schematic illustration of the mechanism of the embodiment of FIG. 1 for forming images on the opposite surfaces of a sheet of copying paper, showing only a principal part thereof in a simplified manner.

As pointed out earlier, the sheet of copying paper taken out from one of the sheet feeding cassettes 252 through 255, 257 is transferred to the paired register rollers 265 with the surface P1 facing upward and held there in a standby state.

Then, as the paired register rollers 265 are driven to operate, the sheet of copying paper P is moved onto the transfer belt 401 operating as part of the transfer section so that it moves with the transfer belt 401.

As the sheet of copying paper P is moved by the transfer belt 401, an image is formed on the surface P1 thereof by the photosensitive drum 244 (for the purpose of simplicity, the four photosensitive drums 244A through 244D are shown as a single drum in FIG. 3) and the trailing edge of the sheet of copying sensor is detected by the sheet tail end sensor 402.

Then, the sheet of copying paper P is moved to the temporary collecting section 271 and stored there with the surface P1 facing upward.

The sheet of copying paper P temporarily collected by the temporary collecting section 271 is then moved again to the paired register rollers 265 with the back surface P2 facing upward and held there in a standby state. Thereafter, as the paired register roller 265 are driven to operate, the sheet of copying paper P is moved onto the transfer belt 401.

As the sheet of copying paper P is moved by the transfer belt 401, an image is formed on the rear surface P2 thereof by the photosensitive drum 244 and the trailing edge of the sheet of copying sensor is detected by the sheet tail end sensor 402, when the operation of forming images on the respective surfaces of the sheet of copying paper P is completed.

Figure 4:
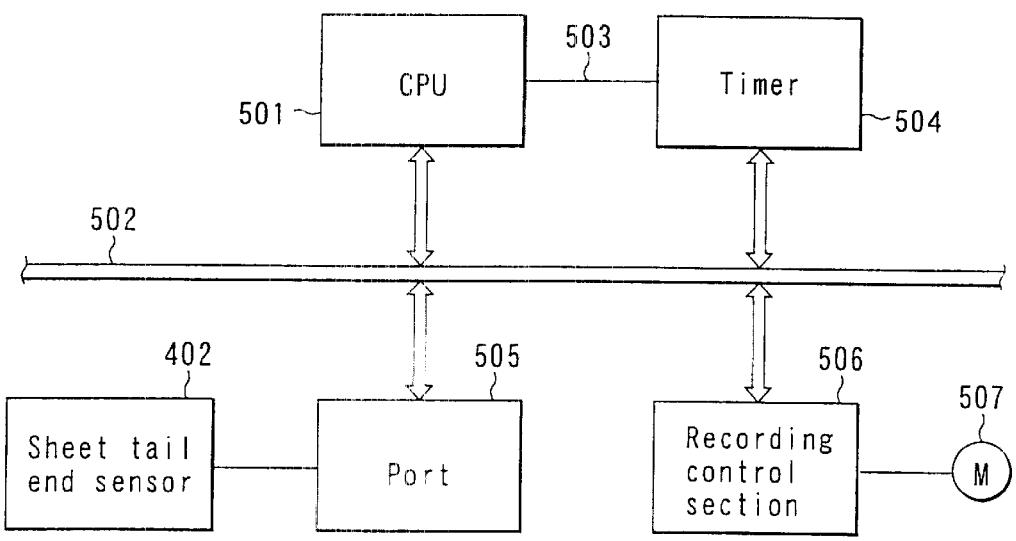
FIG. 4 is a schematic block diagram of the control system of the mechanism of FIG. 3 for forming images on the opposite surfaces of a sheet of copying paper.

FIG. 4 is a schematic block diagram of the control system of the mechanism of FIG. 3 for forming images on the opposite surfaces of a sheet of copying paper P. In FIG. 4, reference symbol 501 denotes a CPU (Central Processing Unit) that controls the overall operation of forming images on the opposite surfaces of a sheet of copying paper P.

The CPU 501 is connected to a timer 504 by way of a bus line 502 and a control line 503. Additionally, the CPU 501 is fed with the detection output of the sheet tail end sensor 402 by way of a port 505 and the bus line 502.

The CPU 501 is further connected to a recording control section 506 by way of the bus line 502. The recording control section 506 controls the operation of forming images on a sheet of copying paper P by controlling a group of motors 507 for driving the above described various rollers, paired rollers, belts and drums according to instructions from the CPU 501.

Figure 5:
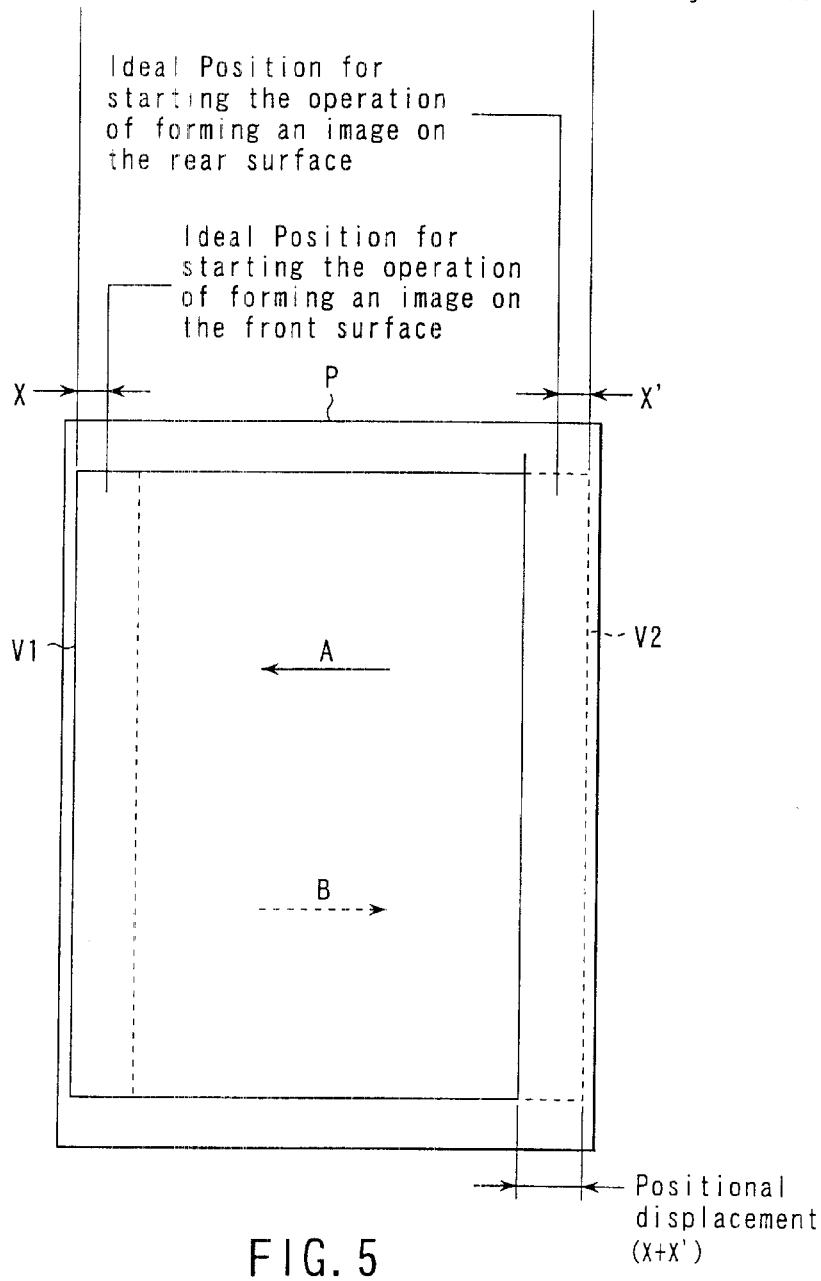
FIG. 5 is a schematic illustration of the mutual displacement of the image formed on the front surface of a sheet of copying paper and the image formed on the rear surface of the sheet.

FIG. 5 is a schematic illustration of the mutual displacement of the image formed on the front surface P1 of a sheet of copying paper and the image formed on the rear surface P2 of a sheet of copying paper P. In FIG. 5, the image V1 formed on the front surface P1 of the sheet of copying paper P is indicated by solid lines, while the image V2 formed on the rear surface P2 of the sheet of copying paper P is indicated by dotted lines. Additionally, in FIG. 5, the direction in which the sheet of copying paper P is moved for forming an image on the front surface P1 of the sheet of copying paper P is indicated by arrow A, while the direction in which the sheet of copying paper P is moved for forming an image on the rear surface P2 of the sheet of copying paper P is indicated by arrow B.

Assume now, that the operation of forming an image on the front surface P1 of the sheet of copying paper P starts at a point located in front of the ideal point for starting the image forming operation and separated from the latter by distance x. Then, the image V1 formed on the front surface P1 of the sheet of copying paper P is displaced leftward from the ideal image on the front surface P1 by distance x.

Meanwhile, when forming an image on the rear surface P2 of the sheet of copying paper P, the sheet is moved in the opposite direction relative to the direction in which the sheet is moved for forming an image on the front surface P1 of the sheet. Therefore, if the operation of forming an image on the rear surface P2 of the sheet of copying paper P starts at a point located in front of the ideal point for starting the image forming operation and separated from the latter by distance x', the image V2 formed on the rear surface P2 of the sheet of copying paper P is displaced also leftward (rightward in FIG. 5) from the ideal image on the rear surface by distance x'.

Thus, the image V1 formed on the front surface P1 of the sheet of copying paper P and the image V2 formed on the rear surface P2 of the sheet are displaced from each other by a distance x+x' in the direction of moving the sheet of copying paper P.

When forming an image on the front surface P1 of a sheet of copying paper P by means of this embodiment, the time period from the time when the operation of the photosensitive drum 244 of forming an image on the front surface P1 of the sheet of copying paper P starts to the time when the trailing edge of the sheet of copying paper P is detected by the sheet tail end sensor 402 is measured and compared with a predetermined ideal time period to obtain information on the mutual displacement of the sheet of copying paper P and the image V1 formed thereon.

Then, the time for starting the operation of forming an image on the rear surface P2 of the sheet of copying paper P is shifted appropriately on the basis of the obtained displacement information so that the image V2 to be formed on the rear surface P2 of the sheet may be aligned with the image V1 formed on front surface P1 and the images V1 and V2 may not be displaced from each other.

Figure 6:
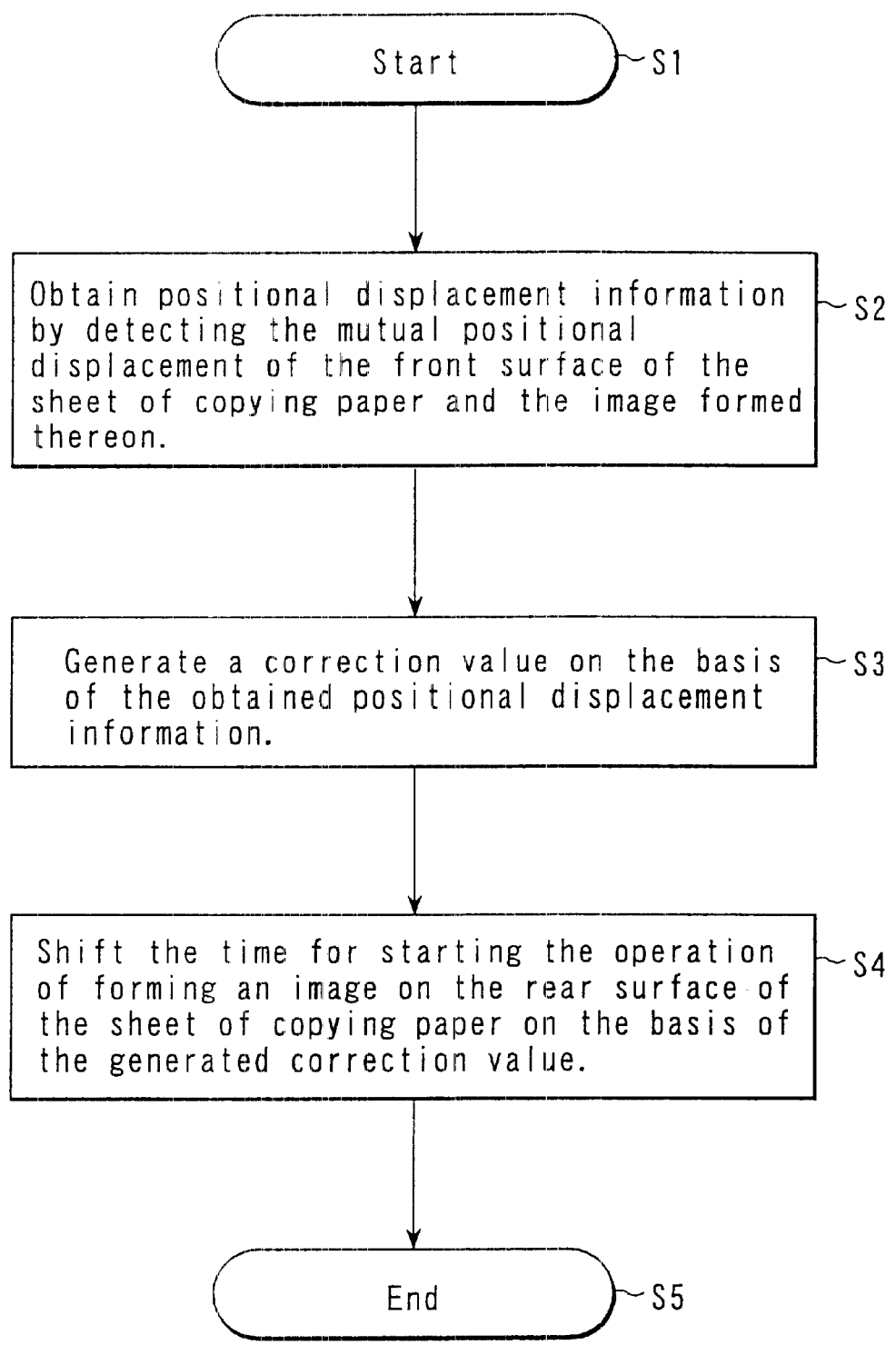
FIG. 6 is a flow chart of the operation of the embodiment of FIG. 1 for preventing any possible mutual displacement of the images to be formed on the front and rear surfaces of a sheet of copying paper.

FIG. 6 is a flow chart of the operation of the embodiment of FIG. 1 for preventing any possible mutual displacement of the images V1 and V2 to be formed on the front and rear surfaces of a sheet of copying paper. Referring to FIG. 6, as the operation starts (Step S1), CPU 501 obtains information on the mutual displacement of the front surface P1 of the sheet of copying paper P and the image V1 formed thereon in Step S2.

More specifically, the CPU 501 measures by means of timer 504 the time period t from the time when the paired register rollers 265 is first driven to rotate and the time when the operation of the photosensitive drum 244 of forming an image on the front surface P1 of the sheet of copying paper P starts.

Subsequently, the CPU 501 measures by means of the timer 504 the time period form the time when the operation of forming an image on the front surface P1 of the sheet of copying paper P by means of the photosensitive drum 244 and the time when the trailing edge of the sheet of copying paper P is detected by the sheet tail end sensor 402.

Then, the CPU 501 compares the measured time period with a predetermined ideal time period T and obtains the sum of the ideal time period T and the temporal displacement $\Delta T$ relative to the ideal time period T, or T+$\Delta T$.

Then, the CPU 501 obtains the total time period from the time when the paired register rollers 265 are first driven to rotate and the time when the trailing edge of the sheet of copying paper P is detected by the sheet tail end sensor 402, or t+T+$\Delta T$, as information on the mutual displacement of the front surface P1 of the sheet of copying paper P and the image V1 formed thereon.

Thereafter, in Step S3, the CPU 501 generates a correction value to be used for the operation of forming an image on the rear surface P2 of the sheet of copying paper P. The correction value is obtained by doubling the temporal displacement $\Delta T$ relative to the ideal time period T out of the total time period from the time when the operation of the photosensitive drum 244 of forming an image on the front surface P1 of the sheet of coping paper P starts to the time when the trailing edge of the sheet of copying paper P is detected by the sheet tail end sensor 402.

Then, in Step S4, the CPU 501 shifts the time for starting the operation of forming an image on the rear surface P2 of the sheet of copying paper P on the basis of the above correction value and actually forms the image on the rear surface P2 to terminate the operation (Step S5).

If the temporal displacement $\Delta T$ shows a positive value, the position at which the operation of forming the image on the front surface of the sheet starts is located in front of the ideal position for forming the image as shown in FIG. 5.

If such is the case, the start of the operation of forming an image on the rear surface P2 of the sheet of copying paper P is delayed by t+2$\Delta T$ from the time when the paired register rollers 265 are driven to rotate as the photosensitive drum 244 starts the operation of forming an image so that the image V2 on the rear surface P2 of the sheet may be accurately aligned with the image V1 formed on the front surface P1 of the sheet.

Thus, with the above described embodiment, information on the relative positional displacement of the front surface P1 of the sheet of copying paper P and the image V1 formed thereon, or t+T+$\Delta T$, is obtained and the time when the operation of forming an image V2 on the rear surface P2 of the sheet of copying paper P is controlled on the basis of the obtained positional displacement information t+T+$\Delta T$.

Thus, the image V1 formed on the front surface P1 of the sheet of copying paper P and the image V2 formed on the rear surface P2 of the sheet can be accurately aligned relative to each other so that any possible positional displacement of the images V1 and V2 formed on the opposite surfaces of the sheet of copying paper P can be reliably minimized for any practical applications.

The positional displacement information t+T+$\Delta T$ can be obtained with ease only by means of a timer 504 by observing the time period t from the time when the paired register rollers 265 are driven to rotate to the time when the operation of forming the image V1 on the front surface P1 of the sheet of copying paper P starts and also the time period T+$\Delta T$ from the time when operation of forming the image V1 on the front surface P1 of the sheet to the time when the trailing edge of the sheet of copying paper P is detected by the sheet tail end sensor 402.

What is claimed is:

1. An image forming apparatus having:
    a first image forming means for feeding a sheet of recording paper and forming an image on one of the opposite surfaces of the sheet; and
    a second image forming means for feeding the sheet of recording paper carrying the image formed by said first image forming means on one of the opposite surfaces of the sheet and forming another image on the other surface of the sheet;
    said image forming apparatus comprising:
        a measuring means for measuring the time period from the time when the operation of forming an image on one of the opposite surfaces of the sheet of recording paper of the first image forming means starts to the time when the tail end of the sheet of recording paper passes a predetermined detecting position; and
        a control means for controlling the time of starting the operation of forming another image on the opposite surface of the sheet of recording paper of the second image forming means on the basis of the time period measured by the measuring means.

2. The image forming apparatus according to claim 1, wherein said measuring means comprises:

a detection means for detecting a temporal displacement of the time as measured by said measuring means and a predetermined ideal time; and a correction means for correcting the time for starting the operation of said second image forming means of forming an image on the opposite surface of the sheet of recording paper on the basis of the outcome of the detecting operation of said detection means.

3. The image forming apparatus according to claim 2, wherein said correction means comprises:

a generation means for generating a correction value on the basis of the outcome of the detecting operation of said detection means;

the time for starting the operation of said second image forming means of forming an image on the opposite surface of the sheet of recording paper is corrected on the basis of the correction value as generated by said generation means.

4. The image forming apparatus according to claim 3, wherein said generation means generates said correction value by doubling the temporal displacement as detected by said detection means.

5. An image forming method having:

a first image forming step of feeding a sheet of recording paper and forming an image on one of the opposite surfaces of the sheet; and a second image forming step of feeding the sheet of recording paper carrying the image formed in said first image forming step on one of the opposite surfaces of the sheet and forming another image on the other surface of the sheet;

said image forming method comprising:

a time measuring step for measuring the time period from the time when the operation of forming an image on one of the opposite surfaces of the sheet of recording paper of the first image forming step starts to the time when the tail end of the sheet of recording paper passes a predetermined detecting position; and a control step of controlling the time of starting the operation of forming another image on the opposite surface of the sheet of recording paper of the second image forming step on the basis of the time period measured in the measuring step.

6. The image forming method according to claim 5, wherein said measuring means comprises:

a detection step for detecting a temporal displacement of the time as measured in said measuring step and a predetermined ideal time; and a correction step for correcting the time for starting the operation of said second image forming step of forming an image on the opposite surface of the sheet of recording paper on the basis of the outcome of the detecting operation of said detection step.

7. The image forming method according to claim 6, wherein said correction step comprises:

a generation step for generating a correction value on the basis of the outcome of the detecting operation of said detection step;

the time for starting the operation of said second image forming step of forming an image on the opposite surface of the sheet of recording paper is corrected on the basis of the correction value as generated in said generation step.

8. The image forming method according to claim 7, wherein said generation step generates said correction value by doubling the temporal displacement as detected in said detection step.

9. An image forming apparatus comprising:

an image forming unit which forms a first image on first surface of a sheet of paper and a second image on a second surface opposite to the first surface of the sheet of paper;

a timer which measures a time period from a time when the image forming unit starts to form the first image on the first surface of a sheet of paper to a time when a trail end of the sheet of paper passes a predetermined detection position; and a processing unit which controls the image forming unit to start an image forming operation of the second image on the second surface of the sheet of paper based on the time period measured by the timer.

10. The image forming apparatus according to claim 9, wherein the processing unit further detects a temporal displacement of a time between the time period measured by the timer and a predetermined ideal time, and corrects a time for starting an image forming operation of the second image on the second surface of the sheet of paper based on the temporal displacement.

11. The image forming apparatus according to claim 10, wherein the processing unit further generates a correction value signal based on the temporal displacement, and corrects a time for starting an image forming operation of the second image on the second surface of the sheet of paper based on the correction value signal.

12. The image forming apparatus according to claim 11, wherein the correction value signal is generated by doubling the temporal displacement detected by the processing unit.

* * * * *